US006643281B1

(12) United States Patent
Ryan

(10) Patent No.: US 6,643,281 B1
(45) Date of Patent: Nov. 4, 2003

(54) SYNCHRONIZATION PREAMBLE METHOD FOR OFDM WAVEFORMS IN A COMMUNICATIONS SYSTEM

(75) Inventor: David James Ryan, Seattle, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/035,210

(22) Filed: Mar. 5, 1998

(51) Int. Cl.[7] .............................. H04J 3/06; H04J 11/00; H04Q 7/00
(52) U.S. Cl. ..................... 370/350; 370/208; 370/328
(58) Field of Search ................................. 370/203, 208, 370/503, 514, 330, 207, 350, 281, 337, 336, 324, 317, 509, 510; 455/13.2, 501, 502, 63; 375/293, 354, 356, 358, 363

(56) References Cited

U.S. PATENT DOCUMENTS

| | | |
|---|---|---|
| 4,249,181 A | 2/1981 | Lee |
| 4,381,562 A | 4/1983 | Acampora |
| 4,644,562 A | 2/1987 | Kavehrad et al. |

(List continued on next page.)

FOREIGN PATENT DOCUMENTS

| | | |
|---|---|---|
| EP | 0 131 662 A1 | 1/1985 |
| EP | 0653973 | 3/1997 |
| EP | 0667695 | 3/2000 |
| WO | WO 89/09965 | 10/1989 |
| WO | WO 94/19877 | 9/1994 |
| WO | WO 96/17455 A1 | 6/1996 |
| WO | WO 97/01256 | 1/1997 |
| WO | WO 97/08861 A1 | 3/1997 |

OTHER PUBLICATIONS

U.S. patent application Ser. No. 08/806,510, Alamouti et al., filed Feb. 24, 1997.
U.S. patent application Ser. No. 08/937,654, Alamouti et al., filed Sep. 24, 1997.

(List continued on next page.)

*Primary Examiner*—Kwang Bin Yao
*Assistant Examiner*—Hanh Nguyen
(74) *Attorney, Agent, or Firm*—Perkins Coie LLP; www.perkinscoie.com

(57) ABSTRACT

A highly bandwidth-efficient communications method is disclosed that enables remote stations to synchronize in time and frequency to their serving base station. The invention enables a base station and its remote stations in a cell to synchronize in a noisy environment where signals interfere from other base stations and remote stations in other cells. The base station forms a forward synchronization burst that includes a plurality of tone frequencies arranged in a distinctive orthogonal frequency division multiplexed pattern unique to the base station. The unique pattern enables a remote station to distinguish the base station's bursts from other signals present in a crowded area. The distinctive orthogonal frequency division multiplexed pattern can be a Hadamard code pattern, for example. When the a base station has received a signal on a reverse link from a remote station, having significant interference, the base station selectively forms a request signal requesting the remote station to respond with a reverse synchronization burst that includes a plurality of tone frequencies arranged in the same distinctive orthogonal frequency division multiplexed pattern. The base station then transmits the forward synchronization burst and the request signal at a base station reference instant of time to the remote station. The reverse synchronization signals selectively occupy time slots in the transmission frame from the remote station to the base station, that would otherwise be occupied by channel control or traffic signals. Only when the base station requests the remote station to respond with a reverse synchronization burst, does this burst preempt the time slot from its other uses.

51 Claims, 13 Drawing Sheets

U.S. PATENT DOCUMENTS

| | | | |
|---|---|---|---|
| 4,723,321 A | | 2/1988 | Saleh |
| 4,726,040 A | | 2/1988 | Acampora |
| 5,054,035 A | | 10/1991 | Tarallo et al. |
| 5,056,112 A | | 10/1991 | Wei |
| 5,130,987 A | | 7/1992 | Flammer |
| 5,142,528 A | | 8/1992 | Kobayashi et al. |
| 5,151,919 A | | 9/1992 | Dent |
| 5,278,862 A | | 1/1994 | Vander Mey |
| 5,289,464 A | | 2/1994 | Wang |
| 5,367,539 A | | 11/1994 | Copley |
| 5,390,216 A | | 2/1995 | Bilitza et al. |
| 5,425,049 A | | 6/1995 | Dent |
| 5,444,697 A | * | 8/1995 | Leung et al. ............ 370/207 |
| 5,452,433 A | | 9/1995 | Nihart et al. |
| 5,509,020 A | | 4/1996 | Iwakiri et al. |
| 5,561,686 A | | 10/1996 | Kobayashi et al. |
| 5,610,951 A | | 3/1997 | Higginson et al. |
| 5,666,359 A | | 9/1997 | Bennett et al. |
| 5,689,502 A | * | 11/1997 | Scott ......................... 370/281 |
| 5,701,120 A | | 12/1997 | Perelman et al. |
| 5,703,902 A | | 12/1997 | Ziv et al. |
| 5,719,883 A | | 2/1998 | Ayanoglu |
| 5,745,479 A | | 4/1998 | Burns et al. |
| 5,784,368 A | | 7/1998 | Weigand et al. |
| 5,799,000 A | | 8/1998 | Hoole |
| 5,818,603 A | | 10/1998 | Motoyama |
| 5,864,559 A | | 1/1999 | Jou et al. |
| 5,883,886 A | * | 3/1999 | Eaton et al. ............... 370/314 |
| 5,898,685 A | * | 4/1999 | Schnizlein ................ 370/350 |
| 5,898,929 A | * | 4/1999 | Haartsen ................... 455/462 |
| 5,914,981 A | | 6/1999 | Veintimilla |
| 5,923,700 A | | 7/1999 | Zhang |
| 5,933,421 A | * | 8/1999 | Alamouti et al. .......... 370/330 |
| 5,987,338 A | | 11/1999 | Gibbons et al. |
| 5,991,289 A | * | 11/1999 | Huang et al. .............. 370/350 |
| 6,002,664 A | | 12/1999 | Schachter |
| 6,005,854 A | * | 12/1999 | Xu et al. .................... 370/335 |
| 6,014,376 A | * | 1/2000 | Abreu et al. ............... 370/350 |
| 6,047,200 A | | 4/2000 | Gibbons et al. |
| 6,064,645 A | * | 5/2000 | Develet, Jr. et al. ....... 370/203 |
| 6,085,114 A | | 7/2000 | Gibbons et al. |
| 6,134,261 A | | 10/2000 | Ryan |
| 6,134,283 A | * | 10/2000 | Sands et al. ............... 375/354 |
| 6,289,037 B1 | | 9/2001 | Gibbons et al. |
| 6,407,993 B1 | * | 6/2002 | Moulsley ................... 370/347 |

OTHER PUBLICATIONS

U.S. patent application Ser. No. 09/095,749, Alamouti et al., filed Jun. 11, 1998.

U.S. patent application Ser. No. 09/128,738, Alamouti et al., filed Aug. 5, 1998.

U.S. patent application Ser. No. 09/259,409, Alamouti et al., filed Feb. 27, 1999.

U.S. patent application Ser. No. 10/017,903, Alamouti et al.

Chen Q. et al, "Performance of a Coded Multi–Carrier DS–CDMA System in Multi–Path Fading Channels" Wireless Personal Communications, vol. 2, No. 1/02, Jan. 1, 1995, pp. 167–183, XP000589618.

Ojanpera et al, "Frames—Hybrid Multiple Access Technology," 1996 IEEE $4^{th}$ Int'l Symposium on Spread Spectrum Techniques, vol. 1, Sep. 22–25, 1996, pp. 320–324.

Rohling H. et al, "Performance of an OFDM–TDMA Mobile Communications System", 1996 IEEE $46^{th}$. Vehicular Technology Conference, Apr. 28–May 1, 1996, vol. 3, No. 46, pp. 1589–1593, XO000595799.

Giner, V.C., "An Approximate Analysis of TDMA Out–of–Slot Random Access Protocols for Microcellular Mobile Communications," Int'l Journal of Wireless Information Networks, vol. 3, No. 1, Jan. 1996, pp. 41–53, XP002077581.

* cited by examiner

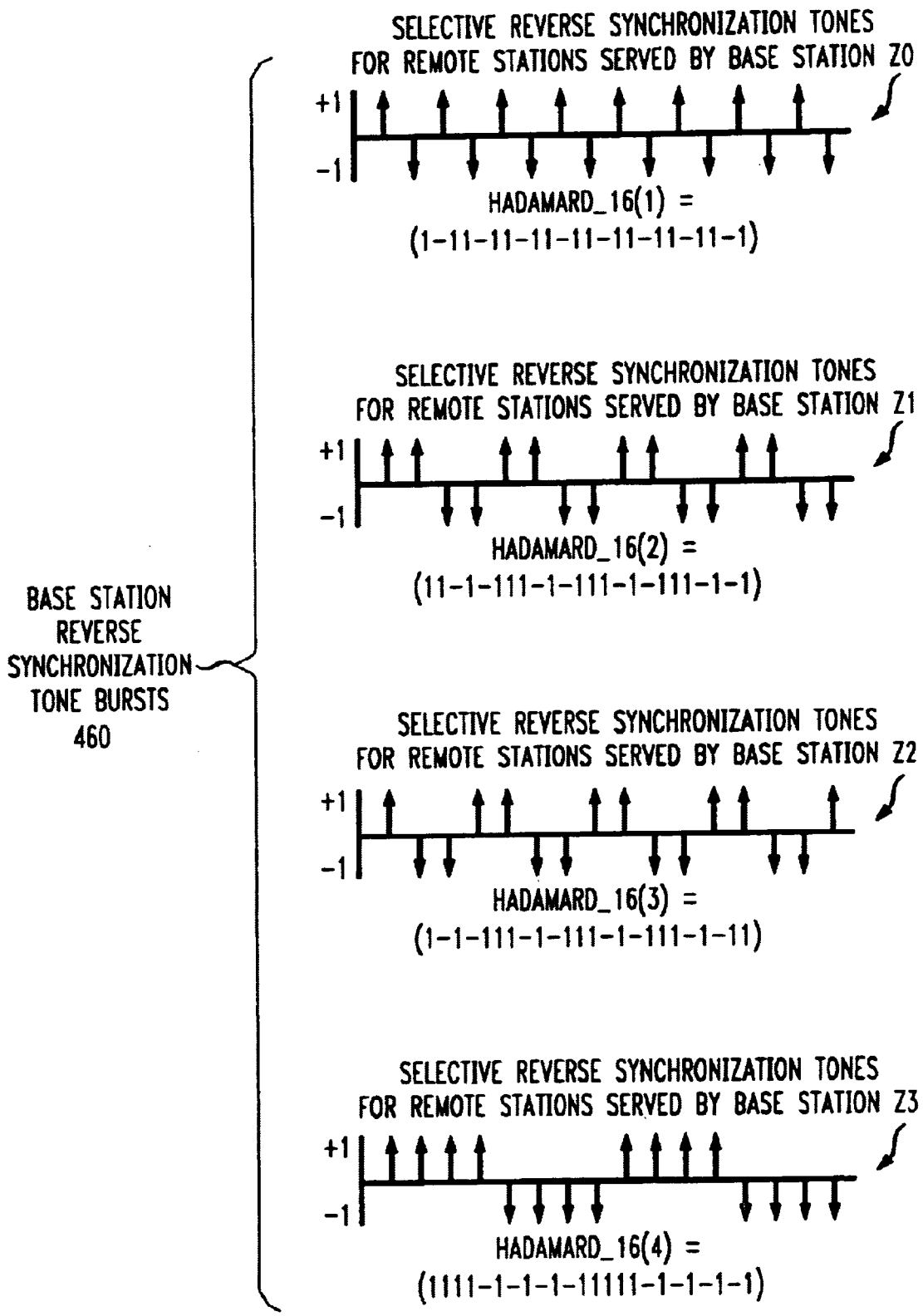

SYNCHRONIZATION PREAMBLE METHOD FOR OFDM WAVEFORMS IN A COMMUNICATIONS SYSTEM

CROSS-REFERENCES TO RELATED APPLICATIONS

The invention disclosed herein is related to the copending U.S. patent application by Dave Gibbons, Bob Maxwell, Dave Ryan entitled "OUT OF CHANNEL CYCLIC REDUNDANCY CODE METHOD FOR A DISCRETE MULTITONE SPREAD SPECTRUM COMMUNICATIONS SYSTEM", Ser. No. 08/803,831, filed Feb. 24,1997, assigned to AT&T Wireless Services, and incorporated herein by reference.

The invention disclosed herein is related to the copending U.S. patent application by Siavash Alamouti, Doug Stolarz, and Joel Becker, entitled "VERTICAL ADAPTIVE ANTENNA ARRAY FOR A DISCRETE MULTITONE SPREAD SPECTRUM COMMUNICATIONS SYSTEM", Ser. No. 08/806,510, filed on the same day as the instant patent application, now abandoned for continuation application Ser. No. 08/937,654, assigned to AT&T Wireless Services, and incorporated herein by reference.

The invention disclosed herein is related to the copending U.S. patent application by Alamouti, et al., entitled "METHOD FOR FREQUENCY DIVISION DUPLEX COMMUNICATIONS", Ser. No. 08/796,584, filed on Feb. 6,1997, assigned to AT&T Wireless Services, and incorporated herein by reference.

The invention disclosed herein is related to the copending U.S. patent application by David Ryan, entitled "FDD FORWARD LINK BEAMFORMING METHOD FOR A FDD COMMUNICATIONS SYSTEM", Ser. No. 09/135,286 filed on Mar. 05,1998, assigned to AT&T Wireless Services, and incorporated herein by reference.

BACKGROUND OF THE INVENTION

1. Field of the Invention

This invention involves improvements to communications systems and methods in a wireless communications system.

2. Description of Related Art

Adaptive beamforming technology has become a promising technology for wireless service providers to offer large coverage, high capacity, and high quality service. Based on this technology, a wireless communication system can improve its coverage capability, system capacity, and performance significantly.

The personal wireless access network (PWAN) system described in the referenced Alamouti, Stolarz, et al. patent applications, uses adaptive beamforming combined with a form of the CDMA protocol known as discrete multitone spread spectrum (DMT-SS) to provide efficient communications between a base station and a plurality of remote units (RU).

An orthogonal frequency division multiplex (OFDM) waveform is composed of many closely spaced carriers, each carrying a single complex (magnitude and phase) symbols. The OFDM carriers are chosen such that the lowest frequency carrier's period is entirely the symbol time duration and each successive carrier is an integer multiple of that frequency. Prior to transmission, the composite signal consisting of multiple orthogonally spaced tones each carrying a single information symbol, is converted into the time domain via an inverse fast Fourier transform (FFT) and transmitted as a complex time domain waveform with a symbol duration as defined above.

$$\left(\frac{1}{\Delta f_{carrier}}\right).$$

Since each carrier (referred to as tone) is modulated by an individual symbol from a users data, the phases are random. This condition can be assured with data scrambling or pre whitening techniques to assure random phase (and possibly amplitude) distribution during idle data streams. The time domain transmitted waveform is thus very noiselike with a peak to average ratio determined by the number of tones and their randomness.

Forward link data (from central hub or base) must contain synchronization information such that remote stations can synchronize in time and frequency to their serving base station. The receive window at each remote station must be adjusted as closely as possible to the received symbol packet (including time of flight delays) to minimize phase change across frequency in the received symbol set. In addition it is desirable to derive system clock and timing information from the base station.

Reverse link transmissions from the remote station to the base station must be received from multiple users within a fixed receive synchronization preamble for the OFDM waveform's window at the serving base station. Errors in transmit timing will result in signals arriving early or late at the desired base station. Either case will yield a phase ramp (either positive or negative) on the received data symbols. Large timing errors will result in partial sampling of incoming time domain waveforms and a resulting loss of orthogonality. In that case received packets that have timing errors will cause large scale interference to all correctly synchronized users.

What is needed is a method to assure accurate synchronization of both forward and reverse links in an OFDM system.

SUMMARY OF THE INVENTION

A highly bandwidth-efficient communications method is disclosed that enables remote stations to synchronize in time and frequency to their serving base station. The invention enables a base station and its remote stations in a cell to synchronize in a noisy environment where signals interfere from other base stations and remote stations in other cells. The base station forms a forward synchronization burst that includes a plurality of tone frequencies arranged in a distinctive orthogonal frequency division multiplexed pattern unique to the base station. The unique pattern enables a remote station to distinguish the base station's bursts from other signals present in a crowded area. The distinctive orthogonal frequency division multiplexed pattern can be a Hadamard code pattern, for example. When the a base station has received a signal on a reverse link from a remote station, having significant interference, the base station selectively forms a request signal requesting the remote station to respond with a reverse synchronization burst that includes a plurality of tone frequencies arranged in the same distinctive orthogonal frequency division multiplexed pattern. The base station then transmits the forward synchronization burst and the request signal at a base station reference instant of time to the remote station. The base station forms the synchronization burst by computing spreading weights to spread an outgoing synchronization signal over the plurality of outgoing synchronization tone frequencies, using the distinctive Hadamard orthogonal frequency division multiplexed pattern.

The receive window at the remote station is controlled by the remote station's reference clock to open at a remote station reference instant before the expected time of arrival of the forward synchronization burst. The phases of signals received by the remote station are referenced with respect to the remote station reference instant. Later, when the remote station sends signals back on the reverse link to the base station, the instant of transmission is referenced with respect to the remote station reference instant. And the phases of signals transmitted by the remote station are referenced with respect to the remote station reference instant. Thus, any errors in the remote station reference instant impairs the SINR of both the forward and reverse links.

The remote station receives the forward synchronization burst and despreads the spread signal by using despreading weights. When the remote station receives the forward synchronization burst from the base station, it recognizes that its serving base station is the source of the unique pattern of the forward burst. Then, in response to the request signal accompanying the forward burst, the remote station prepares a reverse synchronization burst that includes a plurality of tone frequencies arranged in the same distinctive orthogonal frequency division multiplexed pattern. The unique pattern enables the base station to distinguish the remote station's bursts from other signals present. The remote station then transmits to the base station on the reverse link, the reverse synchronization burst. The reverse synchronization burst includes an error signal transmitted at an instant referenced with respect to a remote station reference instant of time. To maximize the signal-to-interference-noise ratio (SINR), the base station monitors the time of arrival and phase of the signals sent on the reverse link from the remote station, to derive clock correction values that it then sends to the remote station.

The reverse synchronization burst that is received by the base station is in the form of a spread signal comprising an incoming signal that includes the synchronization signal spread over a plurality of incoming frequencies. The base station adaptively despreads the spread signal by using despreading weights, recovering the distinctive Hadamard orthogonal frequency division multiplexed pattern. The base station recognizes the reverse synchronization burst and derives a correction value from the error signal, related to a relative time error between the base station reference instant of time and the remote station reference instant of time. The relative time error is the difference between the base station reference instant of time and the remote station reference instant of time less a propagation duration of time of the synchronization burst from the base station to the remote station. The relative time error is compared with the desired relative time difference value. This is the difference between the base station reference instant of time and a desired remote station reference instant of time less the propagation duration of time of the synchronization burst from the base station to the remote station.

Then the base station transmits the correction value to the remote station to correct timing at the remote station. The base station computes spreading weights to spread correction value signals over a plurality of outgoing frequencies to be transmitted to the remote station. In a preferred embodiment, the base station is part of a wireless discrete multitone spread spectrum communications system. In another aspect of the invention, the reverse synchronization signals selectively occupy time slots in the transmission frame from the remote station to the base station, that would otherwise be occupied by channel control or traffic signals. Only when the base station requests the remote station to respond with a reverse synchronization burst, does this burst preempt the time slot from its other uses.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

BRIEF DESCRIPTION OF THE DRAWINGS

In the drawings:

FIG. 3A shows four examples of the distinctive OFDM pattern provided by the Hadamard code for reverse synchronization tones for remote stations in four different cells served by four different base stations.

DISCUSSION OF THE PREFERRED EMBODIMENT

Figure 1:
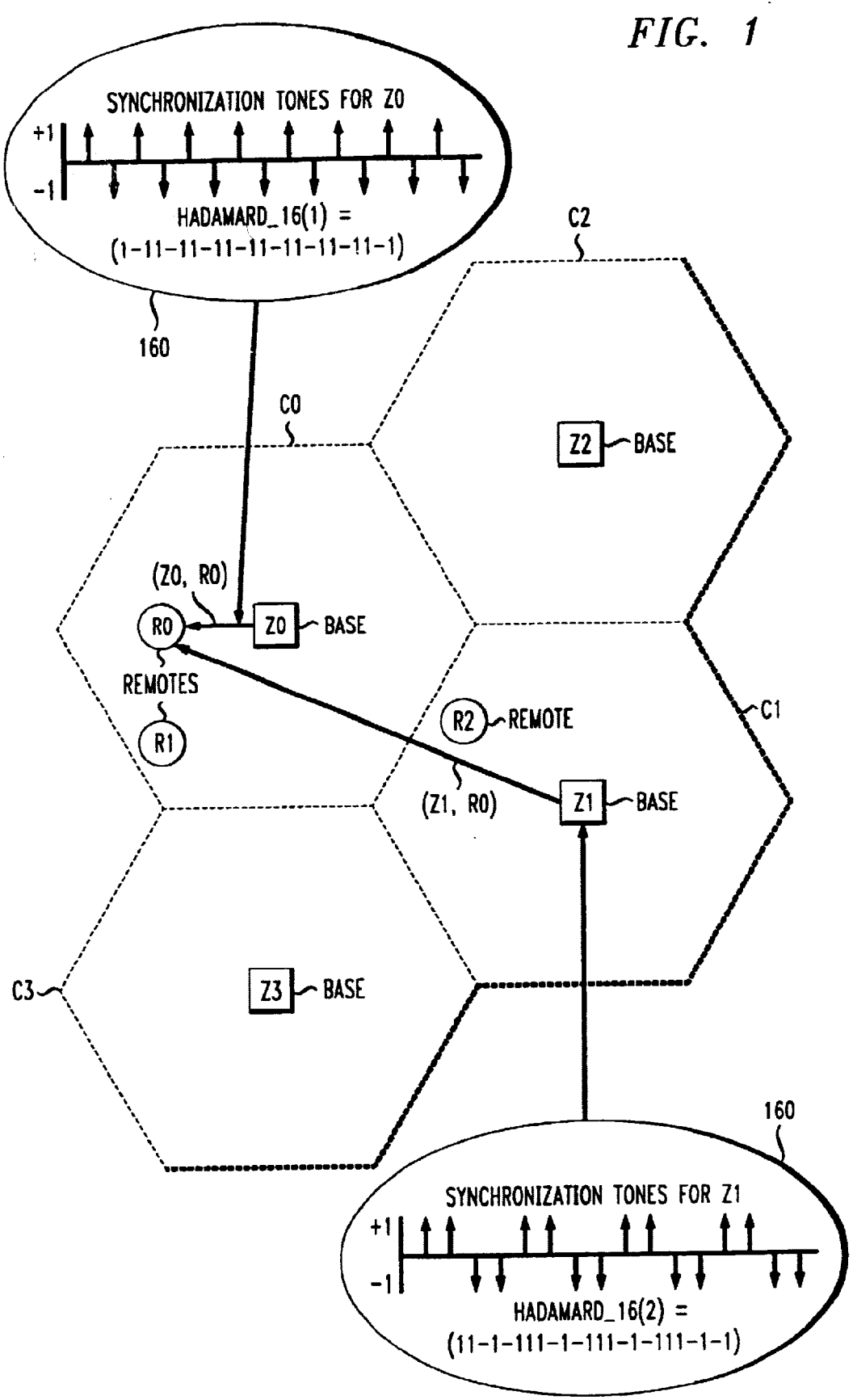
FIG. 1 illustrates a multiple cell wireless communications network, where each cell includes a base station that has a distinctive forward synchronization tone pattern assigned to it.
Figure 3:
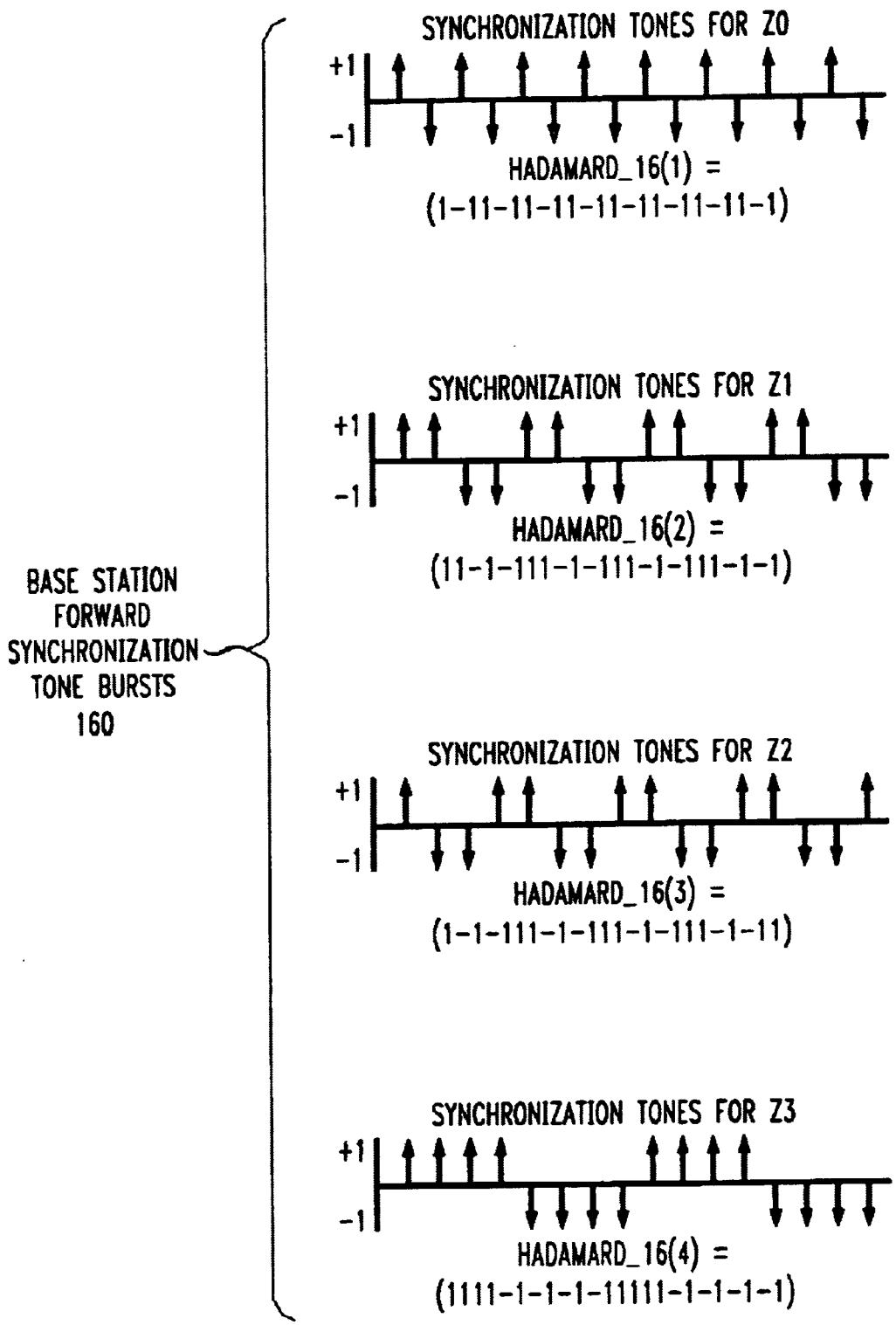
FIG. 3 shows four examples of the distinctive OFDM pattern provided by the Hadamard code for forward synchronization tones for each of four base stations.

A highly bandwidth-efficient communications method is disclosed that enables remote stations to synchronize in time and frequency to their serving base station. The invention enables a base station and its remote stations in a cell to synchronize in a noisy environment where signals interfere from other base stations and remote stations in other cells. FIG. 1 illustrates a multiple cell wireless communications network, where each cell C0, C1, C2, C3 includes a respective base station Z0, Z1, Z2, Z3 that has a distinctive synchronization tone pattern assigned to it. FIG. 3 shows four examples, in the frequency domain, of distinctive orthogonal frequency division multiplex (OFDM) tone patterns H_16[1], H_16[2], H_16[3], and H_16[4], in the forward synchronization bursts 160 the Hadamard code for each of four respective base stations, Z0, Z1, Z2, Z3 . In FIG. 1, cell C0 includes base station Z0 and remote stations R0 and R1. The adjacent cell C1 includes base station Z1 and remote station R2. In a given interval, base station Z0 is shown sending an OFDM synchronization tone pattern signal over path[Z0,R0] to remote station R0, encoded with the Hadamard code pattern H_16[1]=[1−11−11−11−11−11−11−1]. During the same interval, adjacent base station Z1 is shown sending an interfering OFDM synchronization tone pattern signal which is unintentionally transmitted over path [Z1,R0] to remote station R0, encoded with the different Hadamard code pattern H_16[2]=[11−1−111−1−111−1−111−1−1]. The remote station R0 receives both synchronization tone pattern signals from Z0 and Z1, but because of their distinctive OFDM coding, the remote station R0 selects only the H_16[1] synchronization tone pattern signal from base station Z0 for carrying out the synchronization method described below. In the figures herein, transmission paths are designated by the symbol "[ X,Y ]", where "X" is the source along the path and "Y" is the destination along the path.

Figure 1A:
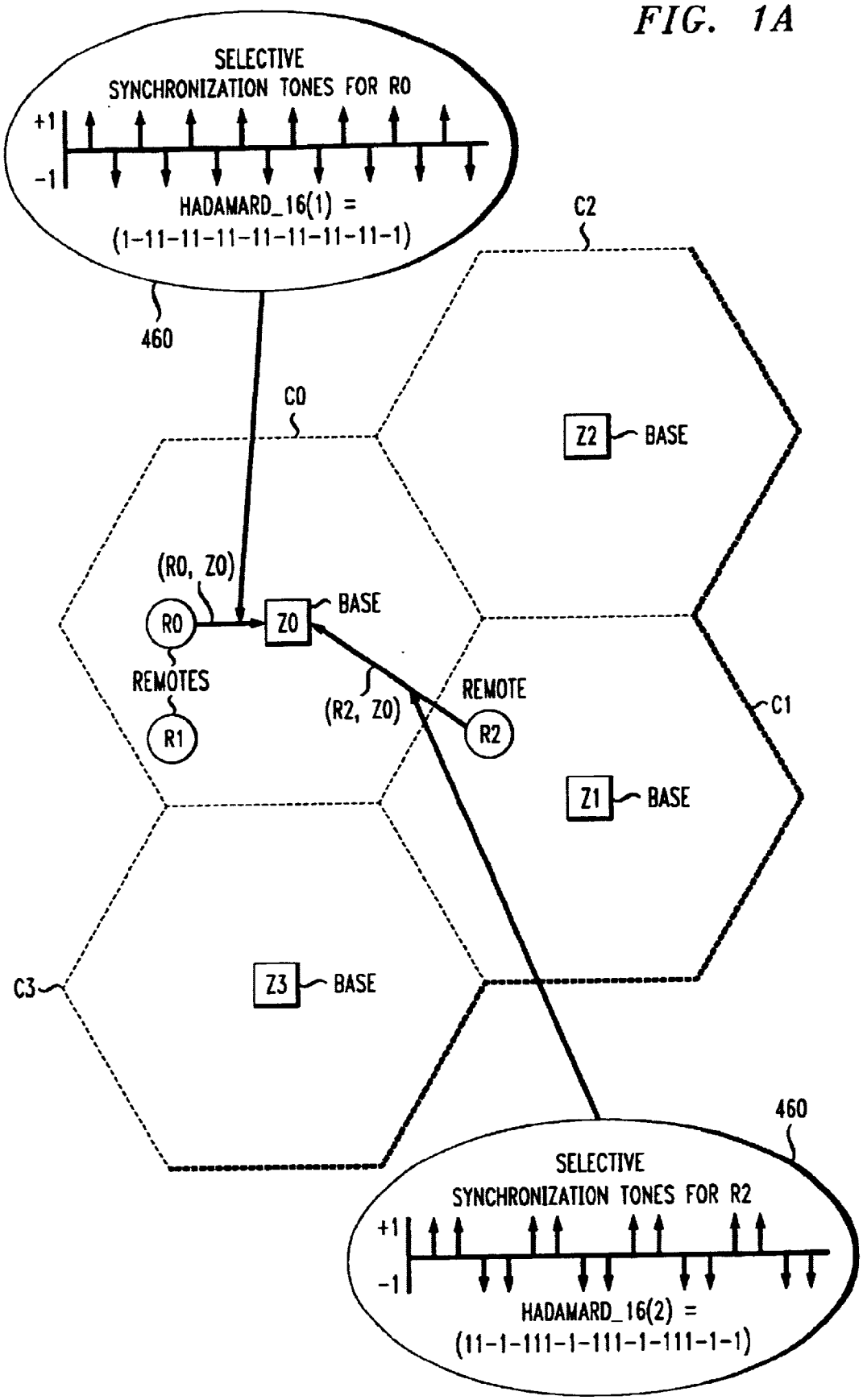
FIG. 1A illustrates the multiple cell wireless communications network of FIG. 1, where each cell includes remote stations that have a distinctive reverse synchronization tone pattern assigned to them that are the same as the distinctive forward synchronization tone pattern assigned to the respective base station that serves them.

FIG. 1A illustrates the multiple cell wireless communications network of FIG. 1, where each cell C0, C1, C2, C3 includes respective remote stations, such as R0 and R1 in cell C1, that have a distinctive synchronization tone pattern assigned to it that is recognized by the base station Z0 in the same cell. FIG. 3A shows four examples, in the frequency domain, of distinctive orthogonal frequency division multiplex (OFDM) tone patterns H_16[1], H_16[2],H_16[3], and H_16[4], in the reverse synchronization bursts 460 provided by the Hadamard code for remote stations in each of four respective cells C0, C1, C2, C3. In FIG. 1A, cell C0 includes base station Z0 and remote stations R0 and R1. The adjacent cell C1 includes base station Z1 and remote station R2. In a given interval, remote station R0 is shown sending an OFDM synchronization tone pattern signal over reverse path[R0,Z0] to base station Z0, encoded with the Hadamard code pattern H_16[1]=[1−11−11−11−11−11−11−1]. During the same interval, remote station R2 in adjacent cell C1 is shown sending an interfering OFDM synchronization tone pattern signal which is unintentionally transmitted over reverse path [R2,Z0] to base station Z0, encoded with the different Hadamard code pattern H_16[2]=[11−1−111−1−111−1−111−1−1]. The base station Z0 receives pattern signals from R0 and R2, but because of their distinctive OFDM coding, the base station Z0 selects only the H_16[1] synchronization tone pattern signal from remote station R0 for carrying out the synchronization method described below.

Figure 2:
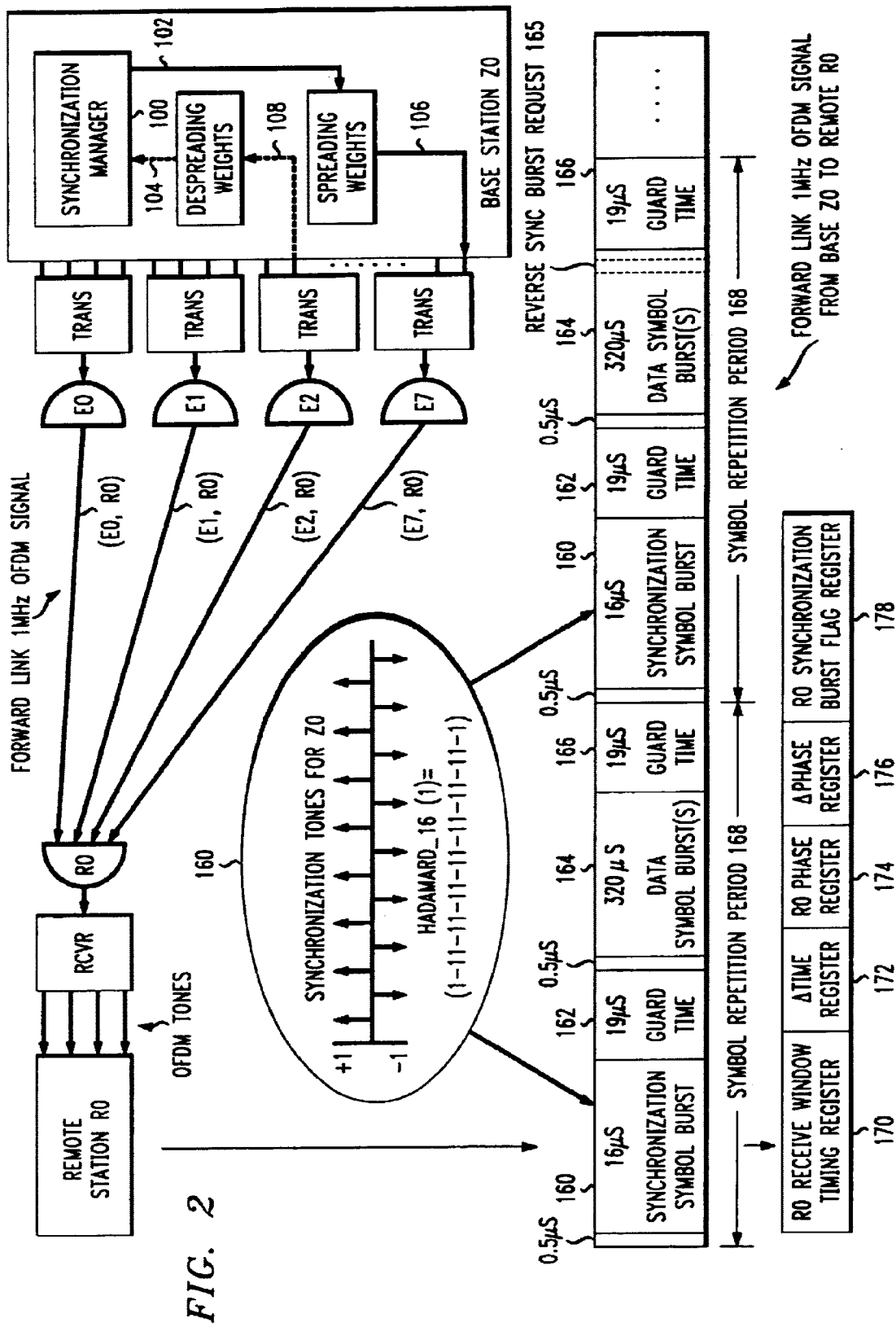
FIG. 2 shows base station Z0 transmitting a forward synchronization burst consisting of a plurality of tones in a distinctive orthogonal frequency division multiplex (OFDM) pattern to a remote station R0. If the base station has detected excessive interference in the reverse channel from the remote station R0, then the base station sends a reverse sync burst request along with the forward synchronization burst to the remote station. This request turns on the R0 sync burst flag at the remote station.
Figure 2A:
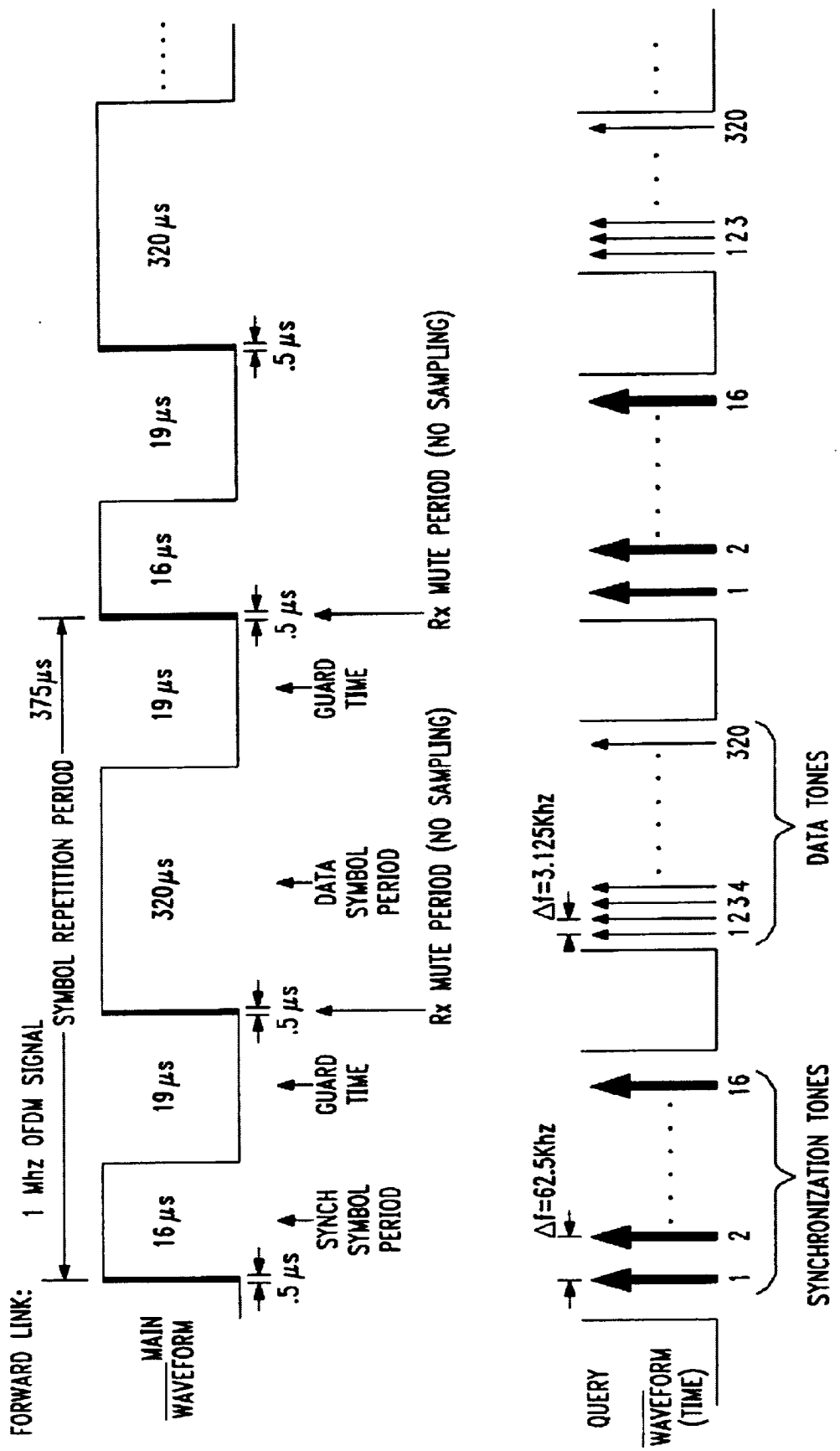
FIG. 2A shows the forward link 1 MHz OFDM signal of FIG. 2, in greater detail.

FIG. 2 shows base station Z0 with eight antenna elements E0, E1, E2, to E7, for transmitting a forward synchronization burst 160 to the remote station R0. The figure shows the forward synchronization tone burst 160 consisting of a plurality of tones in a distinctive OFDM pattern. FIG. 2A shows the forward link 1 MHZ OFDM signal of FIG. 2, in greater detail. The remote station R0 receives the forward synchronization burst 160. The forward synchronization tone burst 160 with the Hadamard code pattern H_16[1] which is unique to base station Z0, is shown in the frequency domain and in the time domain.

The forward synchronization bursts 160 include a plurality of synchronization tone frequencies arranged in a distinctive orthogonal frequency division multiplexed pattern unique to the base station, as shown in FIG. 3. The unique pattern enables a remote station to distinguish the base station's bursts from other signals present, such as shown in FIG. 1. The reverse synchronization bursts 460 include a plurality of synchronization tone frequencies arranged in a distinctive orthogonal frequency division multiplexed pattern unique to the remote station station, as shown in FIG. 3A. The unique pattern enables a base station to distinguish the remote station's bursts from other signals present, such as shown in FIG. 1A.

FIG. 2 shows the base station Z0 with a synchronization manager 100 which is connected by means of line 102 to the spreading weights and by means of line 104 to the despreading weights. Line 108 connects the receivers of the base station to the despreading weights and line 106 connects the transmitters of the base station to the spreading weights. The forward link 1 MHZ OFDM signal format shown in FIG. 2 includes a 16 $\mu$s synchronization symbol burst 160 and a 19 $\mu$s guard time 162. Also included in the forward link OFDM signal is a 320 $\mu$s data symbol burst 164 (which also may be a plurality of bursts), and a 19 $\mu$s guard time 166. These segments of the forward link OFDM signal constitute a symbol repetition period 168. The symbol repetition period 168 is repeated in the forward link OFDM signal. The forward link OFDM signal is transmitted by the base station Z0 to the remote station R0. The base station Z0 receives signals from the remote stations in its cell, such as the remote station R0. If there is a significant amount of interference in the reverse signal received by the base station Z0, then the synchronization manager 100 inserts a reverse synchronization burst request 165 into the forward link OFDM signal, as shown in FIG. 2. The reverse synchronization burst request 165 is then transmitted to the remote station R0 where it is received and processed, identifying the presence of the request 165. In response to identifying the request 165 at the remote station R0, the R0 sync burst flag register 178 in the remote station R0 is set ON. Thereafter, for as long as flag register 178 remains in an ON state, the remote station R0 will respond to the base station Z0 by returning on the reverse link, a reverse synchronization burst.

The remote station R0 includes an R0 receive window timing register 170, a Δ time register 172, an R0 phase register 174, and a Δ phase register 176. The receive window at the remote station R0 is the interval of time during which the remote station R0 is enabled to receive transmissions from the base station Z0. The beginning of the receive window is stored in the R0 receive window timing register 170. If the base station determines that the receive window for the remote station R0 requires a time correction, the base station Z0 will send that correction to the remote station R0 and the resulting value can be stored in the Δ time register 172. The Δ time register 172 stores the time correction for the beginning of the receive window for the remote station R0. In addition, the phase of reference signals transmitted from the remote station R0 with respect to the beginning of the receive window in the receive window timing register 170, is stored as a value in the R0 phase register 174. If the base station Z0 determines that there is an error in the phase of the reference signals transmitted from the remote station R0, the base station can transmit a phase correction to the remote station R0, which is stored in the Δ phase register 176. The phase correction stored in register 176 will serve to correct the phase value stored in register 174 for reference signals transmitted from the remote station R0.

The distinctive orthogonal frequency division multiplexed pattern can be a Hadamard code pattern, for example, as shown in FIGS. 3 and 3A. Hadamard codes are obtained by selecting as codewords the rows of a Hadamard matrix. A Hadamard matrix "A" is a N×N matrix of binary valued elements such that each row differs from any other row in exactly N/2 locations. One row contains all minus ones with the remainder containing N/2 minus ones and N/2 plus ones. The minimum distance for these codes, that is the number of elements in which any two code words differ, is N/2. Other orthogonal frequency division multiplexed patterns can be used, such as Golay codes or Reed-Solomon codes, which have a sufficient minimum distance to enable the synchronization burst 160 from each base station within the reception range of a remote station, to be uniquely encoded. A discussion of minimum distance codes can be found in the book by Rappaport, "Wireless Communications", Prentice Hall, 1996. The distinctive orthogonal frequency division multiplexed patterns of the synchronization bursts shown in FIGS. 3 and 3A, are depicted as patterns of vertical arrows along the ordinate, arrayed along the frequency dimension of the abscissa. The ordinate is the binary value "+1" or "−1" of a respective frequency tone, that is modulated in a binary phase shift keying (BPSK) or a quadrature phase shift keying (QPSK) modulation technique. The frequency tones of the synchronization bursts can also be modulated in a higher order M-ary phase shift keying (MPSK) modulation technique. These modulation techniques are described in greater detail in the book by Rappaport, "Wireless Communications", Prentice Hall, 1996.

The base station of FIG. 2 forms each respective synchronization burst using spread spectrum modulation techniques, by computing spreading weights to spread an outgoing forward synchronization signal over the plurality of outgoing synchronization tone frequencies in the forward synchronization burst 160, using the distinctive Hadamard orthogonal frequency division multiplexed pattern. The forward synchronization burst 160 is then demodulated at the remote station's receiver by crosscorrelation with the Hadamard code that is unique to the transmitting base station. The process of spread spectrum modulation and demodulation is described in the above referenced Alamouti, Stolarz, et al. patent application which is incorporated herein by reference.

The remote station R0 receives the forward synchronization bursts 160 in FIG. 2 and despreads the spread signal by using despreading weights. This process is described in the above referenced Alamouti, Stolarz, et al. patent application which is incorporated herein by reference.

For example: The remote station R0 despreads the forward synchronization burst 160 with the appropriate Hadamard matrix column:

ex: $H_{16}(1) = +1-1+1-1+1-1+1-1 \ldots 1$ $$Signal = \frac{1}{16}\int s \times H_{16}(1)$$

$$SINR \approx 10\log_{10}(\sqrt{I^2 + Q^2})$$

$$phase = \tan^{-1}\left(\frac{Q}{I}\right)$$

Yielding a signal complex value $I_1$, $Q_1$, where Q and I are the axes of a two dimensional constellation diagram depicting a QPSK modulated signal. Additional discussion of QPSK modulation can be found in the book by Rappaport, "Wireless Communications", Prentice Hall, 1996.

Signals that are received by the base station Z0 from remote station R0 are in the form of a spread signal comprising an incoming signal, for example the common access channel (CAC), that includes the data spread over a plurality of incoming frequencies. The base station Z0 adaptively despreads the spread signal by using despreading weights, recovering the data. This process is described in the above referenced Alamouti, Stolarz, et al. patent application which is incorporated herein by reference.

When the a base station has received a signal on a reverse link from a remote station, having significant interference, the base station selectively forms a request signal requesting the remote station to respond with a reverse synchronization burst that includes a plurality of tone frequencies arranged in the same distinctive orthogonal frequency division multiplexed pattern. The base station then transmits the forward synchronization burst and the request signal at a base station reference instant of time to the remote station. The base station forms the synchronization burst by computing spreading weights to spread an outgoing synchronization signal over the plurality of outgoing synchronization tone frequencies, using the distinctive Hadamard orthogonal frequency division multiplexed pattern.

The receive window at the remote station is controlled by the remote station's reference clock to open at a remote station reference instant before the expected time of arrival of the forward synchronization burst. The phases of signals received by the remote station are referenced with respect to the remote station reference instant. Later, when the remote station sends signals back on the reverse link to the base station, the instant of transmission is referenced with respect to the remote station reference instant. And the phases of signals transmitted by the remote station are referenced with respect to the remote station reference instant. Thus, any errors in the remote station reference instant impairs the SINR of both the forward and reverse links.

The remote station receives the forward synchronization burst and despreads the spread signal by using despreading weights. When the remote station receives the forward synchronization burst from the base station, it recognizes that its serving base station is the source of the unique pattern of the forward burst. Then, in response to the request signal accompanying the forward burst, the remote station prepares a reverse synchronization burst that includes a plurality of tone frequencies arranged in the same distinctive orthogonal frequency division multiplexed pattern. The unique pattern enables the base station to distinguish the remote station's bursts from other signals present. The remote station then transmits to the base station on the reverse link, the reverse synchronization burst. The reverse synchronization burst includes an error signal transmitted at an instant referenced with respect to a remote station reference instant of time. To maximize the signal-to-interferencenoise ratio (SINR), the base station monitors the time of arrival and phase of the signals sent on the reverse link from the remote station, to derive clock correction values that it then sends to the remote station.

Figure 4:
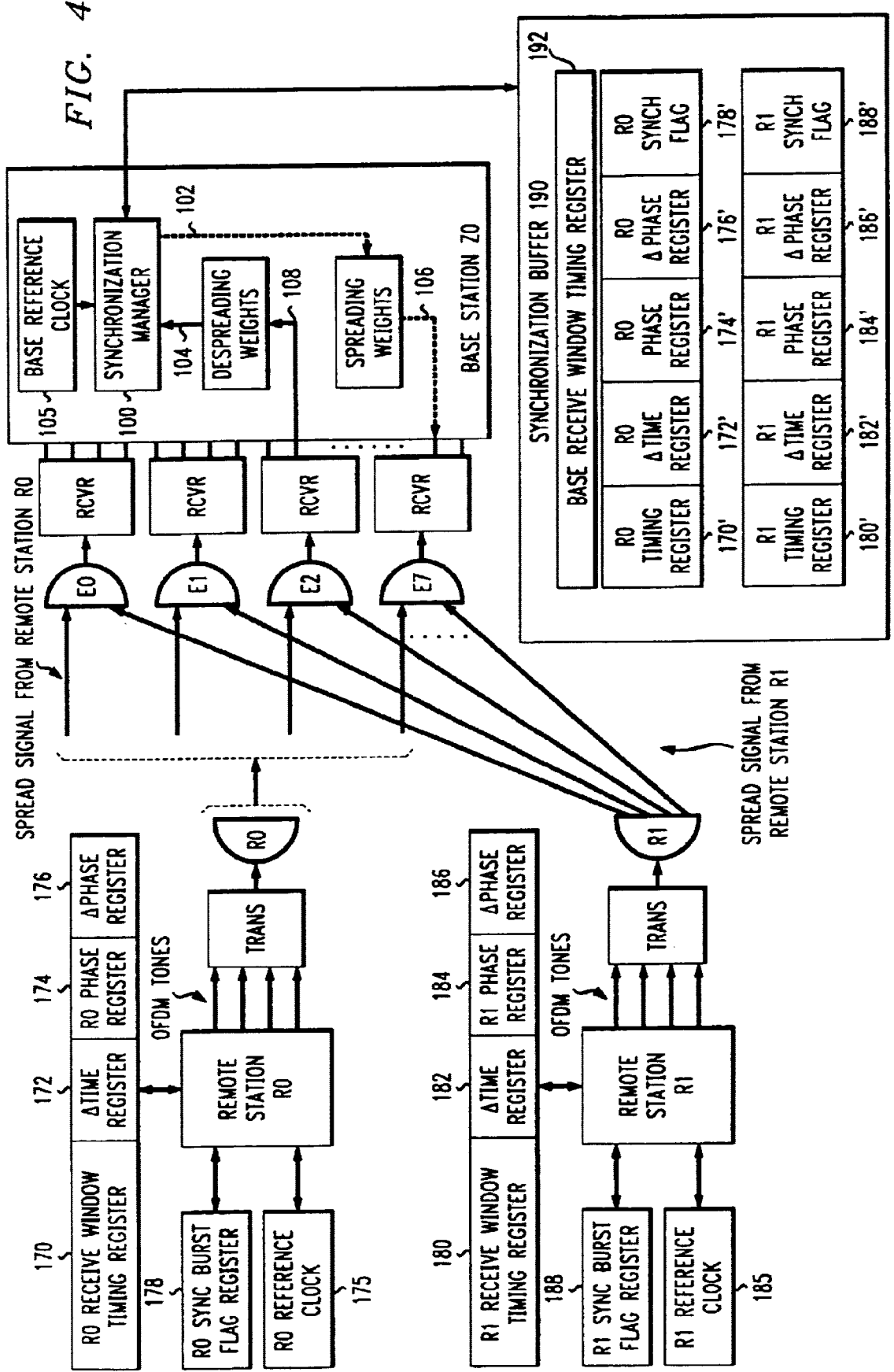
FIG. 4 shows two remote stations R0 and R1, transmitting signals on the reverse link back to the base station Z0, where the base station derives timing corrections for the reference clocks at the respective remote stations.
Figure 4A:
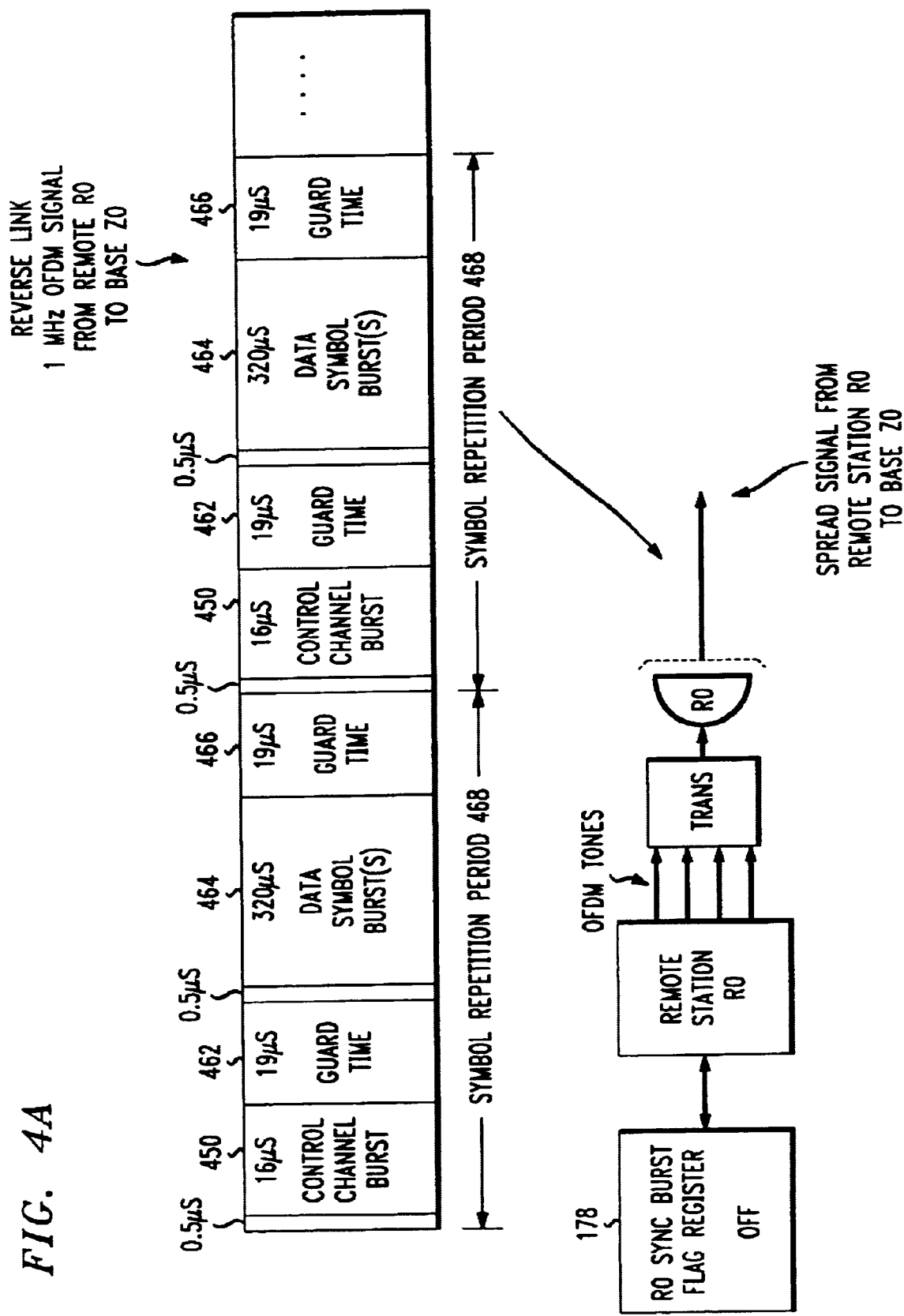
FIG. 4A shows the reverse link OFDM signal from remote station R0 when the R0 sync burst flag is off Control channel or other traffic bursts can occupy the spare frame slot which is available when the R0 sync burst flag is off.

FIG. 4 shows the remote station R0 transmitting a spread signal to the base station Z0 and it also shows the remote station R1 transmitting a spread signal to base station Z0. The remote station R0 includes a reference clock, the R0 reference clock 175 which uses the values stored in the R0 receive window timing register 170 to being the receive window. The value stored in register 170 also serves as the time reference for the beginning of reverse link transmission of a 1 MHZ OFDM signal from the remote station R0 to the base Z0, as is shown in FIG. 4A. During normal operation when there is relatively little interference perceived by the synchronization manager 100 at the base station Z0, the R0 sync burst flag register 178 is in the OFF state. In this state, the reverse link OFDM signal of FIG. 4A is transmitted from the remote station R0 to the base station Z0. As is shown in FIG. 4A, the first field of the symbol repetition period 468 contains a control channel burst 450 of 16 $\mu$s duration, followed by a 19 $\mu$s guard time 462. Thereafter, a data symbol burst or bursts 464 having a 320 $\mu$s duration, is followed by another 19 $\mu$s guard time 466. These segments constitute a one symbol repetition period 468. Symbol repetition period 468 is then repeated for the reverse link OFDM signal.

Figure 4B:
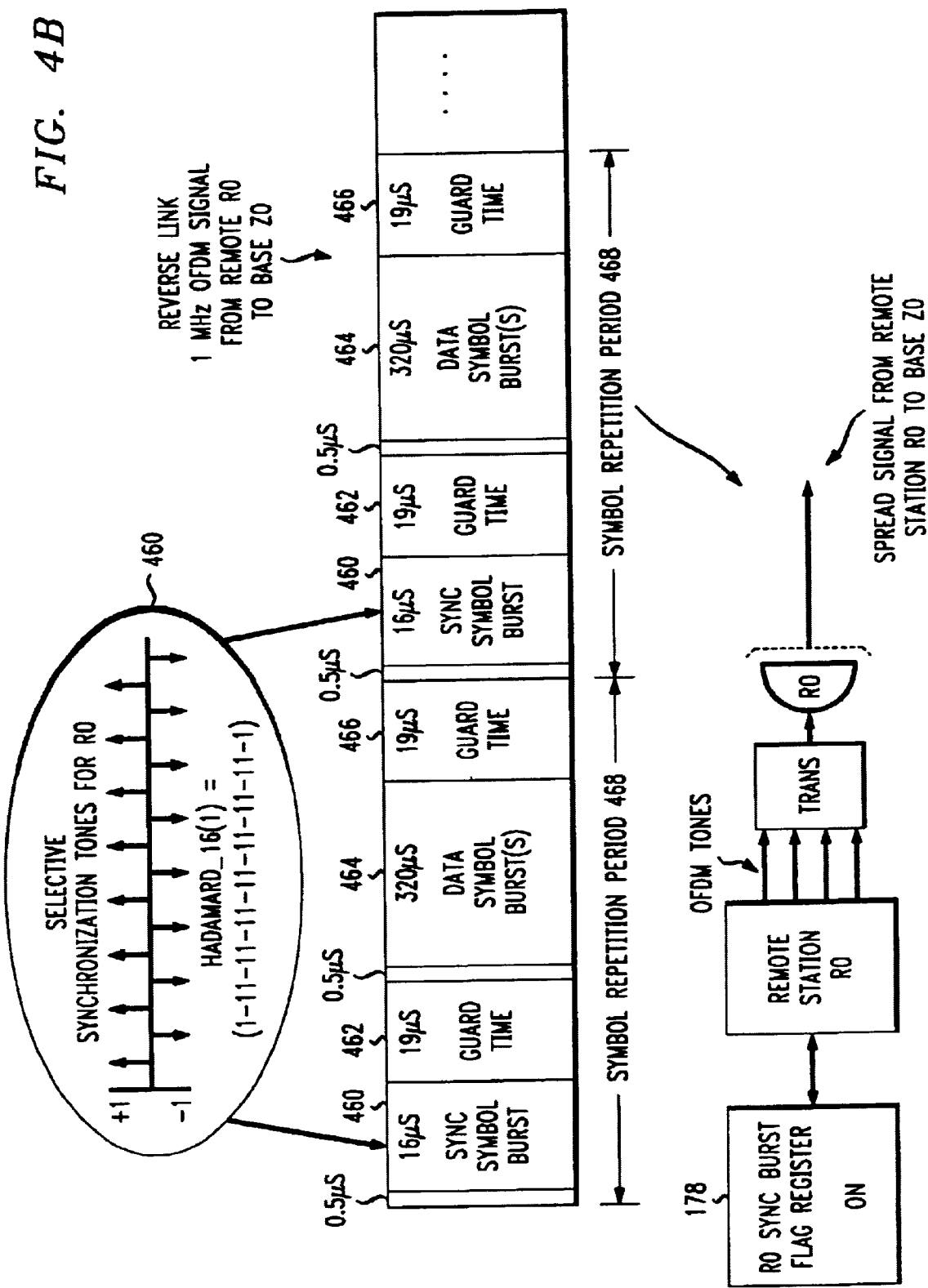
FIG. 4B shows the reverse link OFDM signal from remote station R0 when the R0 sync burst flag is on, resulting in the reverse synchronization symbol burst occupying the spare frame slot that otherwise contains control channel or other traffic bursts.

When the synchronization manager 100 in the base station Z0 perceives that there is significant interference in the reception of the reverse link OFDM signal from the remote station R0, the synchronization manager 100 transmits a reverse synchronization burst request 165 as was previously discussed for FIG. 2. In response, the remote station R0 sets the R0 sync burst flag register 178 into the ON state. Thereafter, the reverse link OFDM signal has the new format shown in FIG. 4B, wherein the space otherwise occupied by the control channel burst 450, is now occupied by the synchronization by the reverse synchronization symbol burst 460. The reverse synchronization burst 460 includes distinctive synchronization tones such as in the Hadamard code pattern, as shown in FIG. 4B. When the base station Z0 receives the reverse link OFDM signal of FIG. 4B, which includes the reverse synchronization burst 460, the base station Z0 is able to distinguish the transmissions from the remote station R0 notwithstanding the relatively high interference level at the base station Z0. The base station Z0 keeps track of its own base receive window timing by means of a value stored in the base received window timing register 192 of its synchronization buffer 190. The base station Z0 also keeps track of the respective timing values in each of the remote stations within its cell C0, by means of the registers 170', 172', 174', 176' and 178' of FIG. 4.

The reverse synchronization burst that is received by the base station is in the form of a spread signal comprising an incoming signal that includes the synchronization signal spread over a plurality of incoming frequencies. The base station adaptively despreads the spread signal by using despreading weights, recovering the distinctive Hadamard orthogonal frequency division multiplexed pattern. The base station recognizes the reverse synchronization burst and derives a correction value from the error signal, related to a relative time error between the base station reference instant of time and the remote station reference instant of time. The relative time error is the difference between the base station reference instant of time and the remote station reference instant of time less a propagation duration of time of the synchronization burst from the base station to the remote station. The relative time error is compared with the desired relative time difference value. This is the difference between the base station reference instant of time and a desired remote station reference instant of time less the propagation duration of time of the synchronization burst from the base station to the remote station.

Then the base station transmits the correction value to the remote station to correct timing at the remote station. The base station computes spreading weights to spread correction value signals over a plurality of outgoing frequencies to be transmitted to the remote station. In a preferred embodiment, the base station is part of a wireless discrete multitone spread spectrum communications system. In another aspect of the invention, the reverse synchronization signals selectively occupy time slots in the transmission frame from the remote station to the base station, that would otherwise be occupied by channel control or traffic signals. Only when the base station requests the remote station to respond with a reverse synchronization burst, does this burst preempt the time slot from its other uses.

Figure 5A:
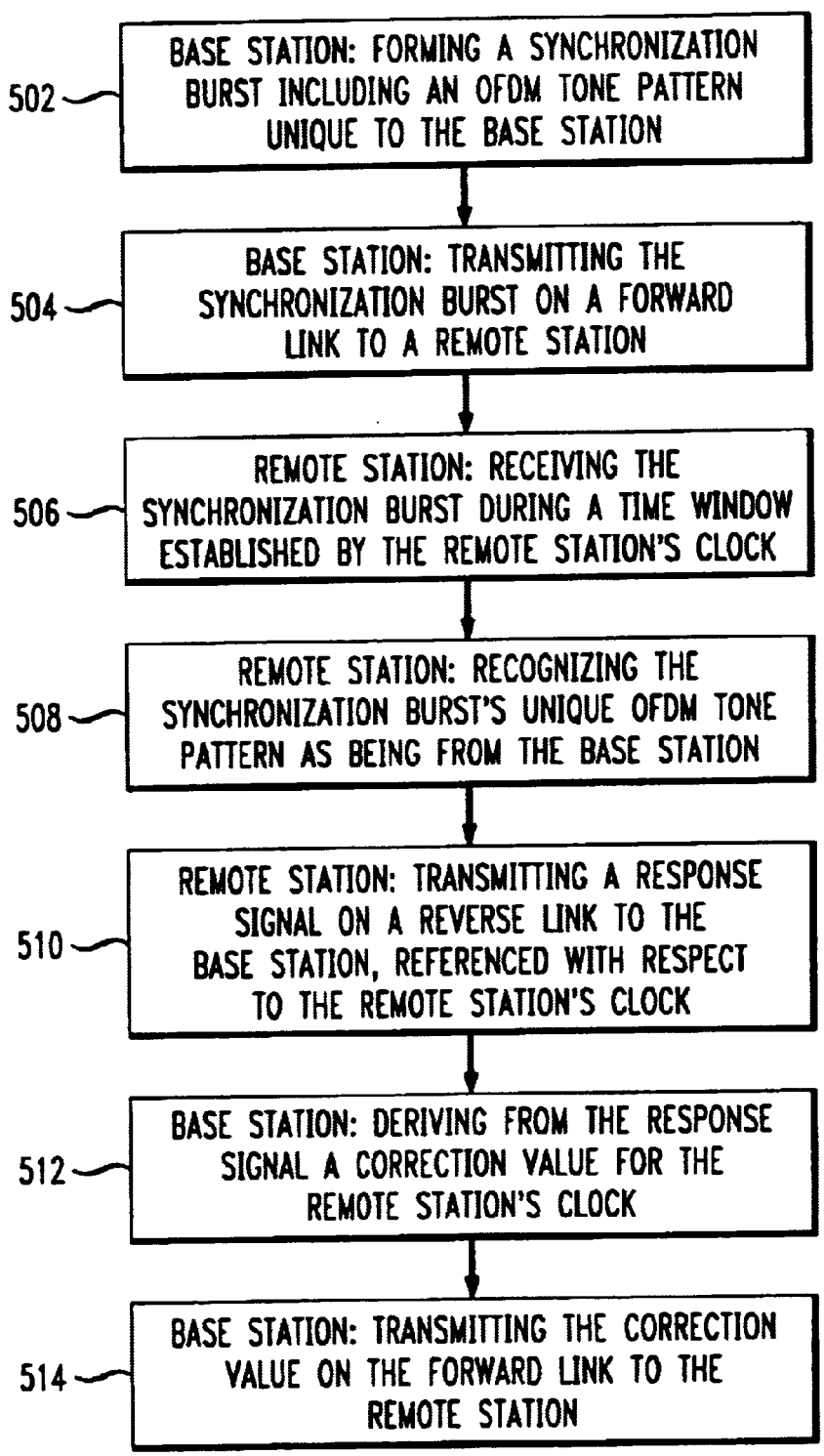
FIG. 5A is a flow diagram of the overall operation of the base station and remote station to correct the reference clock in the remote station, in accordance with the invention.

FIG. 5A is a flow diagram of the overall operation of the base station and remote station to correct the reference clock in the remote station, in accordance with the invention. The sequence of steps for the flow diagram of FIG. 5A are as follows. In step 502, the base station is forming a synchronization burst including an OFDM tone pattern unique to the base station. Then in step 504, the base station is transmitting the synchronization burst on a forward link to a remote station. In step 506, the remote station is receiving the synchronization burst during a time window established by the remote station's clock. Then in step 508, the remote station is recognizing the synchronization burst's unique OFDM tone pattern as being from the base station. In step 510, the remote station is transmitting a response signal in a reverse link to the base station, referenced with respect to the remote station's clock. Then in step 512, the base station is deriving from the response signal, a correction value for the remote station's clock. Then in step 514, the base station is transmitting the correction value on the forward link to the remote station.

Figure 5B:
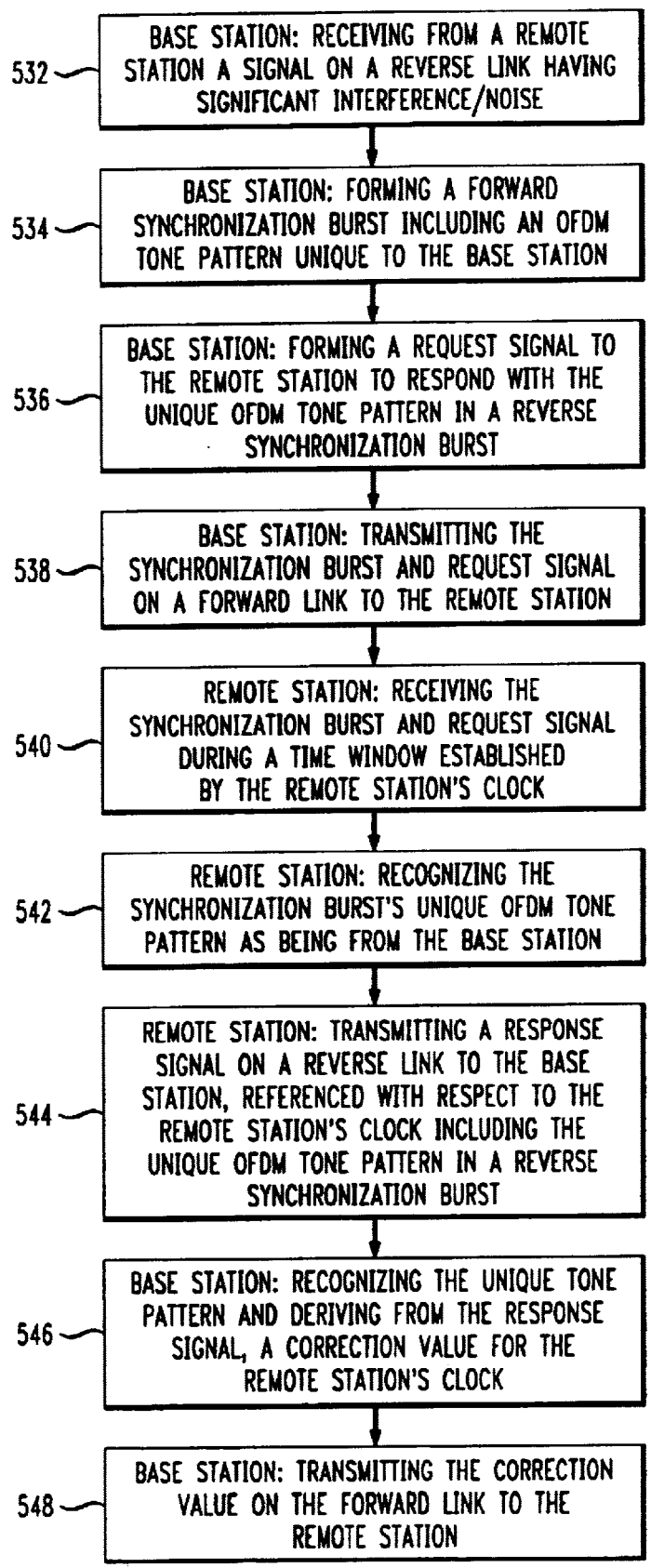
FIG. 5B is a flow diagram of the overall operation of the base station and remote station to selectively transmit the reverse synchronization symbol burst when the base station has detected excessive interference in the reverse channel from the remote station R0.

FIG. 5B is a flow diagram of the overall operation of the base station and remote station to selectively transmit the reverse synchronization symbol burst when the base station has detected excessive interference in the reverse channel from the remote station R0. The flow diagram of FIG. 5B has the following steps. In step 532, the base station is receiving from a remote station, a signal on a reverse link having significant interference and/or noise. Then in step 534, the base station is forming a forward synchronization burst including an OFDM tone pattern unique to the base station. In step 536, the base station is forming a request signal to the remote station to respond with the unique OFDM tone pattern in a reverse synchronization burst. Then in step 538, the base station is transmitting the synchronization burst and request signal on a forward link to the remote station. Then in step 540, the remote station is receiving the synchronization burst and request signal during a time window established by the remote station's clock. In step 542, the remote station is recognizing the synchronization burst's unique OFDM tone pattern as being from the base station. Then in step 544, the remote station is transmitting a response signal on a reverse link to the base station, referenced with respect to the remote station's clock, including the unique OFDM tone pattern in a reverse synchronization burst. In step 546 the base station is recognizing the unique tone pattern from the remote station and is deriving from the response signal, a correction value for the remote station's clock. Then in step 548, the base station is transmitting the correction value on the forward link to the remote station.

Figure 6A:
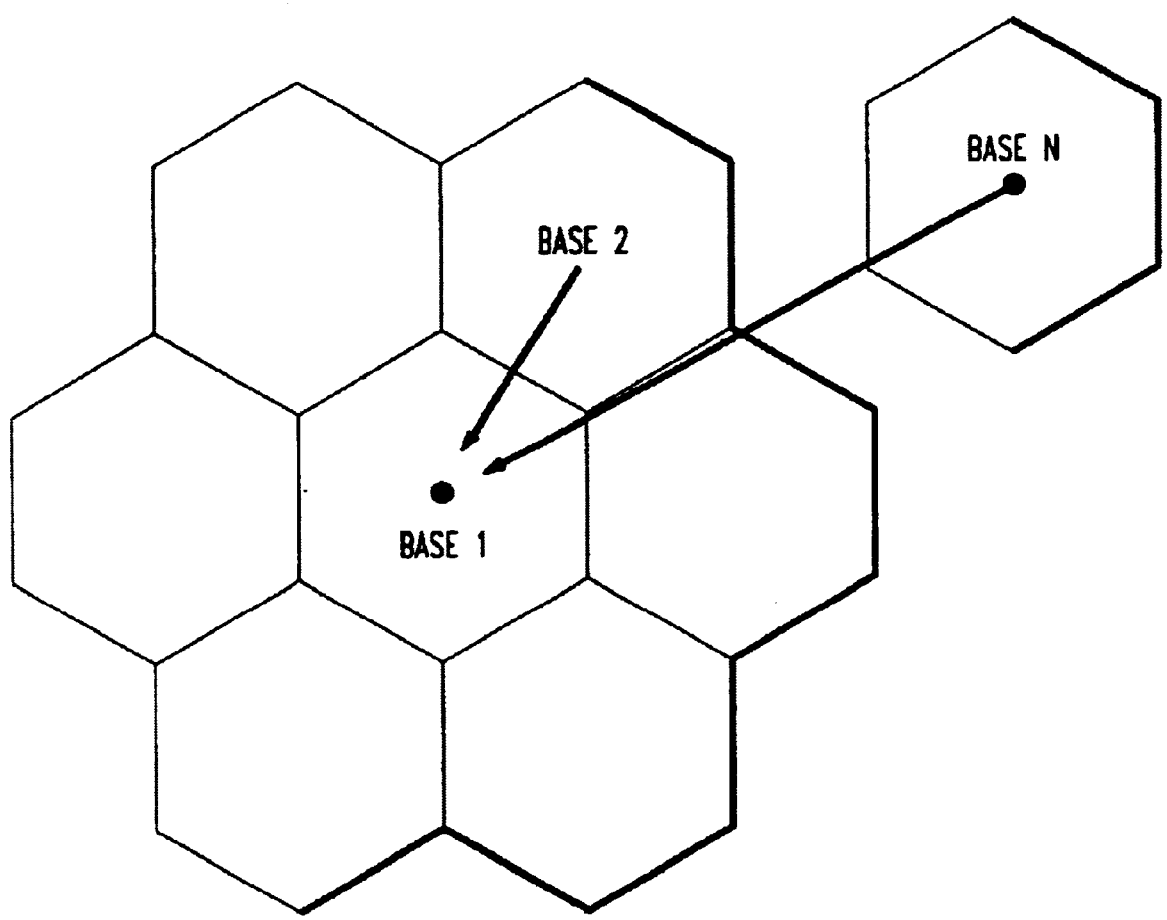
FIG. 6A shows an example of several base stations in several cells interfering with each other's reception.
Figure 6B:
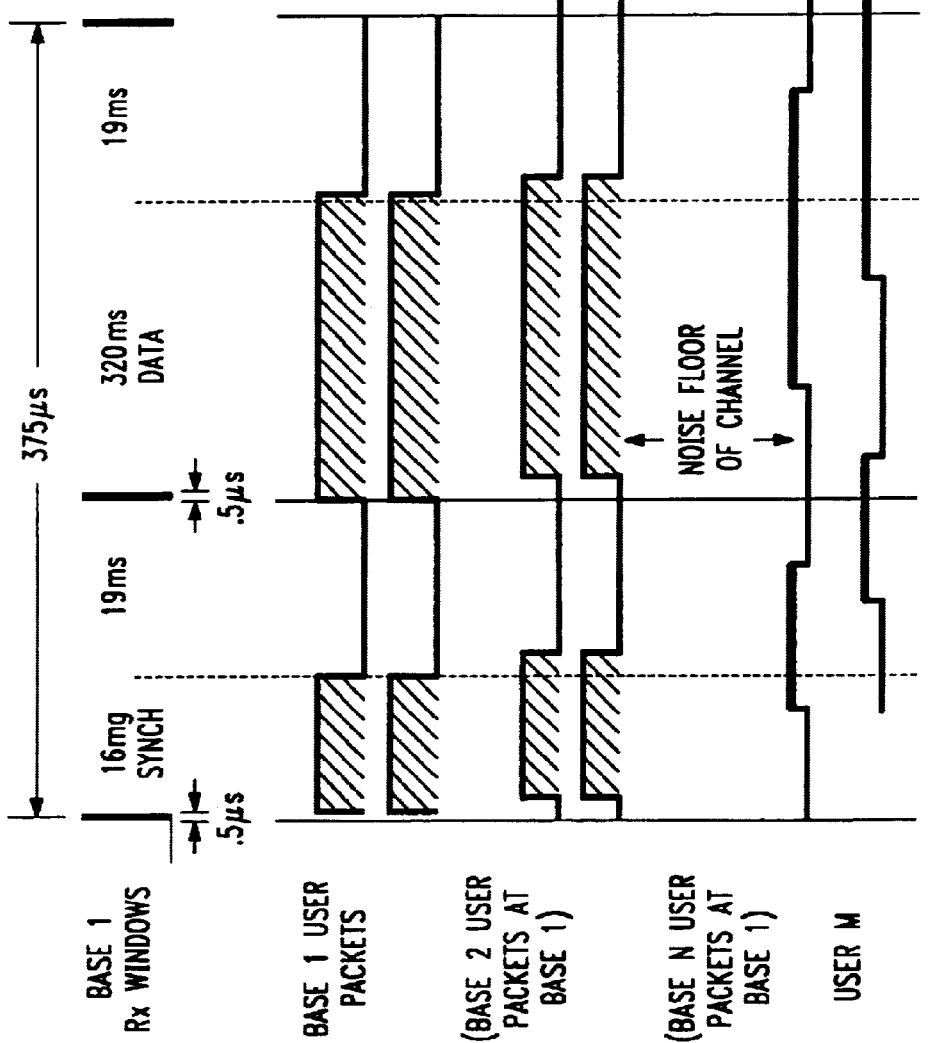
FIG. 6B shows the effect of the invention in minimizing the interference depicted in FIG. 6A.

FIG. 6A shows an example of several base stations and several cells interfering with each other's reception, and FIG. 6B shows the effect of the invention in minimizing the interference depicted in FIG. 6A. From the perspective of base 1 in FIG. 6A, all of the remote stations within the cell for base 1 are closely synchronized by virtue of the above-described invention. However, remote stations within the cell occupied by base 2 will have their respective bursts arriving late relative to the receive window at base 1. This is illustrated in the timing diagram of FIG. 6B. If the transmissions from the remote stations in the second cell served by base 2 exceed their guard time due to the time of flight to base 1, if they are of sufficient amplitude they will still degrade reception of the desired signals at base 1. This problem is overcome by the distinctive OFDM synchronization burst which base 1 will require of its remote stations within its cell. Base 1 will transmit a reverse synchronization burst request signal 165 to its respective base stations within its cell, and they will, in turn, respond with the distinctive OFDM reverse synchronization burst. In this manner, the remote stations within the cell occupied by base 1 will have their transmissions recognized by base station 1, notwithstanding the significant interference posed by remote stations being served by base station 2. The 19 μs guard times provide approximately a 3.8 mile distance between the base station N and base station 1 of FIG. 6A, before the guard times are exceeded. This would include any multipath reflections that are ≦3.8 miles long in their total path length. By virtue of the invention described above, interference imposed by any remote stations in adjacent cells to base 1, will be distinguishable from remote stations within the cell occupied by base 1, by means of the selective response by the remote stations in base 1 using the reverse synchronization bursts.

The reverse channel synchronizations use the same synchronization technique as do the forward channel synchronizations, as described above. The primary difference is that the individual remote units only inject their synchronization bursts into the reverse OFDM signals, when they are requested to by the respective serving base stations.

In this manner, the invention provides an improved effective signal to interference/noise ratio for remote stations and base stations in a high interference environment.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. A highly bandwidth-efficient communications method, comprising:

forming a synchronization burst at an antenna element of a base station, including a plurality of tone frequencies arranged in a distinctive orthogonal frequency division multiplexed pattern unique to the base station;

transmitting the synchronization burst from the antenna element at a base station reference instant of time;

receiving the synchronization burst at a remote station during a remote station receive time window which begins at a remote station reference instant of time established by a remote station clock;

recognizing the pattern of the plurality of tone frequencies as having the base station as the source of the synchronization burst;

transmitting an error signal back to the base station at an instant referenced with respect to the remote station reference instant of time, in response to the recognizing;

deriving from the error signal a correction value related to a relative time error between the base station reference instant of time and the remote station reference instant of time; and transmitting the correction value to the remote station to correct the remote station clock.

2. The highly bandwidth-efficient communications method of claim 1, wherein deriving further comprises:

deriving from the error signal a second value related to a relative phase error between the base station and the remote station; and transmitting the second value to the remote station to correct the remote station.

3. The highly bandwidth-efficient communications method of claim 1, wherein forming the synchronization burst comprises:

selecting the distinctive orthogonal frequency division multiplexed pattern unique to the base station;

computing spreading weights at the base station to spread an outgoing synchronization signal over a plurality of outgoing frequencies, using the pattern; and spreading the synchronization signal over the plurality of outgoing frequencies using the computed spreading weights, thereby forming the synchronization burst.

4. The highly bandwidth-efficient communications method of claim 1, wherein deriving the error signal at the base station comprises:

receiving at the base station a spread signal comprising an incoming signal that includes the error signal spread over a plurality of incoming frequencies;

adaptively despreading the spread signal received at the base station by using despreading weights, recovering the error signal;

deriving from the error signal the relative time error;

comparing the relative time error with a desired relative time difference value;

calculating the correction value in response to the comparing, to minimize a difference between the relative time error and the desired relative time difference value.

5. The highly bandwidth-efficient communications method of claim 1, wherein the base station is part of a wireless discrete multitone spread spectrum communications system.

6. The highly bandwidth-efficient communications method of claim 1, wherein a time of arrival of the error signal at the base station is used to derive the correction value.

7. The highly bandwidth-efficient communications method of claim 1, wherein a phase of the error signal when it arrives at the base station is used to derive the correction value.

8. The highly bandwidth-efficient communications method of claim 1, wherein a numerical value calculated at the remote station is used to derive the correction value.

9. The highly bandwidth-efficient communications method of claim 8, wherein the numerical value is derived from a measured difference between the remote station reference instant of time and a time of arrival of the synchronization burst at the remote station.

10. The highly bandwidth-efficient communications method of claim 1, wherein the relative time error is the difference between the base station reference instant of time and the remote station reference instant of time less a propagation duration of time of the synchronization burst from the base station to the remote station; and wherein the desired relative time difference value is a difference between the base station reference instant of time and a desired remote station reference instant of time less the propagation duration of time of the synchronization burst from the base station to the remote station.

11. A highly bandwidth-efficient communications system, comprising:

means for forming a synchronization burst at an antenna element of a base station, including a plurality of tone frequencies arranged in a distinctive orthogonal frequency division multiplexed pattern unique to the base station;

means for transmitting the synchronization burst from the antenna element at a base station reference instant of time;

means for receiving the synchronization burst at a remote station during a remote station receive time window which begins at a remote station reference instant of time established by a remote station clock;

means for recognizing the pattern of the plurality of tone frequencies as having the base station as the source of the synchronization burst;

means for transmitting an error signal back to the base station at an instant referenced with respect to the remote station reference instant of time, in response to the recognizing means;

means for deriving from the error signal a correction value related to a relative time error between the base station reference instant of time and the remote station reference instant of time; and means for transmitting the correction value to the remote station to correct the remote station clock.

12. The highly bandwidth-efficient communications system of claim 11, wherein the deriving means further comprises:

means for deriving from the error signal a second value related to a relative phase error between the base station and the remote station; and means for transmitting the second value to the remote station to correct the remote station.

13. The highly bandwidth-efficient communications system of claim 11, wherein the means for forming the synchronization burst comprises:

means for selecting the distinctive orthogonal frequency division multiplexed pattern unique to the base station;

means for computing spreading weights at the base station to spread an outgoing synchronization signal over a plurality of outgoing frequencies, using the pattern; and means for spreading the synchronization signal over the plurality of outgoing frequencies using the computed spreading weights, thereby forming the synchronization burst.

14. The highly bandwidth-efficient communications system of claim 11, wherein the means for deriving the error signal at the base station comprises:

means for receiving at the base station a spread signal comprising an incoming signal that includes the error signal spread over a plurality of incoming frequencies;

means for adaptively despreading the spread signal received at the base station by using despreading weights, recovering the error signal;

means for deriving from the error signal the relative time error;

means for comparing the relative time error with a desired relative time difference value;

means for calculating the correction value in response to the comparing means, to minimize a difference between the relative time error and the desired relative time difference value.

15. The highly bandwidth-efficient communications system of claim 11, wherein the base station is part of a wireless discrete multitone spread spectrum communications system.

16. The highly bandwidth-efficient communications system of claim 11, wherein a time of arrival of the error signal at the base station is used to derive the correction value.

17. The highly bandwidth-efficient communications system of claim 11, wherein a phase of the error signal when it arrives at the base station is used to derive the correction value.

18. The highly bandwidth-efficient communications system of claim 11, wherein a numerical value calculated at the remote station is used to derive the correction value.

19. The highly bandwidth-efficient communications system of claim 18, wherein the numerical value is derived from a measured difference between the remote station reference instant of time and a time of arrival of the synchronization burst at the remote station.

20. The highly bandwidth-efficient communications system of claim 11, wherein the relative time error is the difference between the base station reference instant of time and the remote station reference instant of time less a propagation duration of time of the synchronization burst from the base station to the remote station; and wherein the desired relative time difference value is a difference between the base station reference instant of time and a desired remote station reference instant of time less the propagation duration of time of the synchronization burst from the base station to the remote station.

21. A highly bandwidth-efficient communications method, comprising:

forming a synchronization burst at a terrestrial base station, wherein the synchronization burst includes a plurality of tone frequencies arranged in a distinctive orthogonal frequency division multiplexed pattern unique to the base station;

transmitting the synchronization burst at a base station reference instant of time, wherein the synchronization burst uniquely identifies the base station to a remote station;

receiving an error signal back from the remote station at an instant referenced with respect to a remote station reference instant of time;

deriving a correction value from the error signal, related to a relative time error between the base station reference instant of time and the remote station reference instant of time; and transmitting the correction value to the remote station to correct timing at the remote station.

22. The highly bandwidth-efficient communications method of claim 21, wherein deriving further comprises:

deriving from the error signal a second value related to a relative phase error between the base station and the remote station; and transmitting the second value to the remote station to correct the remote station.

23. The highly bandwidth-efficient communications system of claim 21, wherein the base station is part of a wireless discrete multitone spread spectrum communications system.

24. The highly bandwidth-efficient communications system of claim 21, wherein a time of arrival of the error signal at the base station is used to derive the correction value.

25. The highly bandwidth-efficient communications system of claim 21, wherein a phase of the error signal when it arrives at the base station is used to derive the correction value.

26. A highly bandwidth-efficient communications system, comprising:

means for forming a synchronization burst at a terrestrial base station, wherein the synchronization burst includes a plurality of tone frequencies arranged in a distinctive orthogonal frequency division multiplexed pattern unique to the base station;

means for transmitting the synchronization burst at a base station reference instant of time, wherein the synchronization burst uniquely identifies the base station to a remote station;

means for receiving an error signal back from the remote station at an instant referenced with respect to a remote station reference instant of time;

means for deriving a correction value from the error signal, related to a relative time error between the base station reference instant of time and the remote station reference instant of time; and means for transmitting the correction value to the remote station to correct timing at the remote station.

27. The highly bandwidth-efficient communications system of claim 26, wherein the deriving means further comprises:

means for deriving from the error signal a second value related to a relative phase error between the base station and the remote station; and means for transmitting the second value to the remote station to correct the remote station.

28. The highly bandwidth-efficient communications system of claim 26, wherein the base station is part of a wireless discrete multitone spread spectrum communications system.

29. The highly bandwidth-efficient communications system of claim 26, wherein a time of arrival of the error signal at the base station is used to derive the correction value.

30. The highly bandwidth-efficient communications system of claim 26, wherein a phase of the error signal when it arrives at the base station is used to derive the correction value.

31. A highly bandwidth-efficient communications method, comprising:

receiving at a base station a signal on a reverse link from a remote station, having significant interference;

forming a forward synchronization burst at the base station, including a plurality of tone frequencies arranged in a distinctive orthogonal frequency division multiplexed pattern unique to the base station;

selectively forming at the base station a request signal requesting the remote station to respond with a reverse synchronization burst, including a plurality of tone frequencies arranged in the distinctive orthogonal frequency division multiplexed pattern;

transmitting the forward synchronization burst and the request signal at a base station reference instant of time to the remote station;

receiving at the base station a signal on the reverse link from the remote station the reverse synchronization burst and an error signal at an instant referenced with respect to a remote station reference instant of time;

recognizing at the base station the reverse synchronization burst and deriving a correction value from the error signal, related to a relative time error between the base station reference instant of time and the remote station reference instant of time; and transmitting the correction value to the remote station to correct the remote station.

32. The highly bandwidth-efficient communications method of claim 31, wherein the deriving further comprises:

deriving from the error signal a second value related to a relative phase error between the base station and the remote station; and transmitting the second value to the remote station to correct the remote station.

33. The highly bandwidth-efficient communications system of claim 31, wherein the base station is part of a wireless discrete multitone spread spectrum communications system.

34. The highly bandwidth-efficient communications system of claim 31, wherein a time of arrival of the error signal at the base station is used to derive the correction value.

35. The highly bandwidth-efficient communications system of claim 31, wherein a phase of the error signal when it arrives at the base station is used to derive the correction value.

36. A highly bandwidth-efficient communications system, comprising:

means for receiving at a base station a signal on a reverse link from a remote station, having significant interference;

means for forming a forward synchronization burst at the base station, including a plurality of tone frequencies arranged in a distinctive orthogonal frequency division multiplexed pattern unique to the base station;

means for selectively forming at the base station a request signal requesting the remote station to respond with a reverse synchronization burst, including a plurality of tone frequencies arranged in the distinctive orthogonal frequency division multiplexed pattern;

means for transmitting the forward synchronization burst and the request signal at a base station reference instant of time to the remote station;

means for receiving at the base station a signal on the reverse link from the remote station the reverse synchronization burst and an error signal at an instant referenced with respect to a remote station reference instant of time;

means for recognizing at the base station the reverse synchronization burst and deriving a correction value from the error signal, related to a relative time error between the base station reference instant of time and the remote station reference instant of time; and means for transmitting the correction value to the remote station to correct the remote station.

37. The highly bandwidth-efficient communications system of claim 36, wherein the deriving means further comprises:

means for deriving from the error signal a second value related to a relative phase error between the base station and the remote station; and means for transmitting the second value to the remote station to correct the remote station.

38. The highly bandwidth-efficient communications system of claim 36, wherein the base station is part of a wireless discrete multitone spread spectrum communications system.

39. The highly bandwidth-efficient communications system of claim 36, wherein a time of arrival of the error signal at the base station is used to derive the correction value.

40. The highly bandwidth-efficient communications system of claim 36, wherein a phase of the error signal when it arrives at the base station is used to derive the correction value.

41. A highly bandwidth-efficient communications method, comprising:
   forming a synchronization burst at an antenna element of a base station, including a plurality of tone frequencies arranged in a distinctive orthogonal frequency division multiplexed code pattern unique to the base station;
   transmitting the synchronization burst from the antenna element at a base station reference instant of time;
   receiving the synchronization burst at a remote station;
   recognizing the code pattern of the plurality of tone frequencies as having the base station as the source of the synchronization burst;
   transmitting an error signal back to the base station;
   deriving from the error signal a correction value; and
   transmitting the correction value to the remote station to synchronize the remote station.

42. A highly bandwidth-efficient communications method, comprising:
   receiving at a base station a signal on a reverse link from a remote station, having significant interference;
   forming a forward synchronization burst at the base station, including a plurality of tone frequencies arranged in a distinctive orthogonal frequency division multiplexed pattern unique to the base station;
   selectively forming at the base station a request signal requesting the remote station to respond with a reverse synchronization burst, including a plurality of tone frequencies arranged in the distinctive orthogonal frequency division multiplexed pattern;
   transmitting the forward synchronization burst and the request signal to the remote station;
   receiving at the base station a signal on the reverse link from the remote station the reverse synchronization burst; and
   recognizing at the base station the reverse synchronization burst.

43. A wireless communications method to enable a base station and its remote station to synchronize in a noisy environment, comprising:
   receiving at a base station a signal on a reverse link from a remote station, accompanied by significant interference;
   forming at the base station a request signal in response to the significant interference, the request signal requesting the remote station to respond with a reverse synchronization burst;
   transmitting from the base station a forward synchronization burst and the request signal to the remote station;
   preparing a reverse synchronization signal at the remote station in response to the request; and
   preemptively transmitting the reverse synchronization signal from the remote station during a time slot in a transmission frame from the remote station to the base station, that would otherwise be occupied by control or traffic signals.

44. The wireless communications method of claim 43, wherein the reverse synchronization burst includes a plurality of tone frequencies arranged in a distinctive orthogonal frequency division multiplexed pattern also used by the base station in the forward synchronization burst.

45. A wireless communications method to enable a base station and its remote station to synchronize in a noisy environment, comprising:
   receiving at a base station a signal on a reverse link from a remote, accompanied by significant interference,
   forming at the base station a request signal in response to the significant interference, the request signal requesting the remote station to respond with a reverse synchronization burst;
   transmitting from the base station a forward synchronization burst and the request signal to the remote station;
   preparing a reverse synchronization signal at the remote station in response to the request;
   preemptively transmitting the reverse synchronization signal from the remote station during a time slot in a transmission frame from the remote station to the base station, that would otherwise be occupied by control or traffic signals, the reverse synchronization signal having an error;
   receiving at the base station the reverse synchronization signal having the error;
   deriving a correction value from the error at the base station; and
   transmitting the correction value from the base station to the remote station to correct the remote station.

46. The wireless communications method of claim 45, wherein a time of arrival of the reverse synchronization signal at the base station is used to derive the correction value.

47. The wireless communications method of claim 45, wherein a phase of the reverse synchronization signal when it arrives at the base station is used to derive the correction value.

48. The wireless communications method of claim 45, wherein the reverse synchronization burst includes a plurality of tone frequencies arranged in a distinctive orthogonal frequency division multiplexed pattern used by the base station in the forward synchronization burst.

49. A wireless communications method to enable a base station and its remote station to synchronize in a noisy environment, comprising:
   receiving at a base station a signal on a reverse link from a remote, accompanied by significant interference,
   forming at the base station a request signal in response to the significant interference, the request signal requesting the remote station to respond with a reverse synchronization burst;
   transmitting from the base station a forward synchronization burst and the request signal to the remote station, the synchronization burst including a plurality of tone frequencies arranged in a distinctive orthogonal frequency division multiplexed pattern unique to the base station;
   preparing a reverse synchronization signal at the remote station in response to the request;
   preemptively transmitting the reverse synchronization signal from the remote station during a time slot in a transmission frame from the remote station to the base station, that would otherwise be occupied by control or traffic signals, the reverse synchronization signal having an error;

the reverse synchronization burst includes a plurality of tone frequencies arranged in the distinctive orthogonal frequency division multiplexed pattern used by the base station in the forward synchronization burst;

receiving at the base station the reverse synchronization signal having the error;

deriving a correction value from the error at the base station; and transmitting the correction value from the base station to the remote station to correct the remote station.

50. The wireless communications method of claim 49, wherein a time of arrival of the reverse synchronization signal at the base station is used to derive the correction value.

51. The wireless communications method of claim 49, wherein a phase of the reverse synchronization signal when it arrives at the base station is used to derive the correction value.

* * * * *